(12) United States Patent
VoBa et al.

(10) Patent No.: US 9,703,586 B2
(45) Date of Patent: *Jul. 11, 2017

(54) DISTRIBUTION CONTROL AND TRACKING MECHANISM OF VIRTUAL MACHINE APPLIANCES

(75) Inventors: Son VoBa, Sammamish, WA (US); Octavian T. Ureche, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1000 days.

This patent is subject to a terminal disclaimer.

(21) Appl. No.: 12/707,004

(22) Filed: Feb. 17, 2010

(65) Prior Publication Data

US 2011/0202916 A1    Aug. 18, 2011

(51) Int. Cl.
*G06F 9/455* (2006.01)
*G06F 21/62* (2013.01)
*H04L 9/08* (2006.01)
*H04L 29/06* (2006.01)

(52) U.S. Cl.
CPC .......... *G06F 9/45558* (2013.01); *G06F 21/62* (2013.01); *H04L 9/0897* (2013.01); *H04L 63/061* (2013.01); *G06F 2009/45575* (2013.01)

(58) Field of Classification Search
CPC ................ G06F 21/10; G06F 9/45558; G06F 2009/4557; G06F 21/62; G06F 2009/45575; H04L 9/08; H04L 9/0877; H04L 63/06; H04L 9/3226; H04L 63/083; H04L 67/148; H04L 29/08639; H04L 9/0897; H04L 63/061

USPC ................................... 713/193; 380/277-278
See application file for complete search history.

(56) References Cited

U.S. PATENT DOCUMENTS

| 6,014,651 A | 1/2000 | Crawford |
| 7,409,719 B2 | 8/2008 | Armstrong et al. |
| 7,428,636 B1* | 9/2008 | Waldspurger ......... H04L 63/083 |
| | | 713/164 |
| 2002/0169987 A1 | 11/2002 | Meushaw et al. |
| 2006/0005189 A1* | 1/2006 | Vega ..................... G06F 9/4856 |
| | | 718/1 |
| 2007/0180257 A1 | 8/2007 | Bae et al. |
| 2007/0253549 A1 | 11/2007 | Celikkan et al. |

(Continued)

OTHER PUBLICATIONS

"R-Crypto Disk Security 1.4," May 12, 2009, 2 pages, downloaded at http://r-crypto-disk-security.smartcode.com/info.html.

(Continued)

*Primary Examiner* — Robert Leung
*Assistant Examiner* — Carlos M De Jesus Lassala
(74) *Attorney, Agent, or Firm* — Baker & Hostetler LLP

(57) ABSTRACT

A virtual hard disk drive containing a guest operating system is bound to a source computing device through encryption. When the virtual hard drive is moved to a difference computing device, a virtual machine manager instantiates a virtual machine and causing the virtual machine to boot the operating system from the virtual hard disk drive. Because the guest operating system is encrypted by an encryption device on a source computing device, the virtual machine causing the decryption of the guest operating system with a copy of the key. The virtual hard disk is bound to the target computing device through encryption based on a hardware on the target computing device.

19 Claims, 7 Drawing Sheets

(56) References Cited

U.S. PATENT DOCUMENTS

| | | | | |
|---|---|---|---|---|
| 2008/0192937 A1* | 8/2008 | Challener | ............... | G06F 21/32 380/278 |
| 2009/0080662 A1* | 3/2009 | Thibadeau | .............. | G06F 21/31 380/286 |
| 2009/0164994 A1* | 6/2009 | Vasilevsky | .......... | G06F 9/45533 718/1 |
| 2009/0169020 A1 | 7/2009 | Sakthikumar et al. | | |
| 2009/0216975 A1 | 8/2009 | Halperin et al. | | |
| 2009/0217047 A1 | 8/2009 | Akashika et al. | | |
| 2009/0282266 A1* | 11/2009 | Fries | ..................... | G06F 21/602 713/193 |
| 2011/0154023 A1* | 6/2011 | Smith | ..................... | G06F 21/78 713/155 |

OTHER PUBLICATIONS

Microsoft TechNet, "File System Security Settings for Virtual Server," 2009, 6 pages, downloaded at http://technet.microsoft.com/en-us/library/cc708358(WS.10).aspx.

Oberheide, J. et al., "Empirical Exploitation of Live Virtual Machine Migration," 6 pages, 2008, downloaded at http://www.eecs.umich.edu/fjgroup/pubs/blackhat08-migration.pdf.

\* cited by examiner

DISTRIBUTION CONTROL AND TRACKING MECHANISM OF VIRTUAL MACHINE APPLIANCES

BACKGROUND

To expand the number of operating systems and application programs that can run on a computer system, a field of technology has developed in which a given computer, called a host, will include an emulator program that allows the host computer to emulate other computing device configurations. The host computer can both run software configured for its native hardware and software configured for computers having different hardware configurations.

When a guest computer system is emulated on a host computer system, the guest computer system is called a "virtual machine" as the guest computer system only exists in the host computer system as a software representation of the operation of one specific hardware configuration that may diverge from the native machine. The virtual machine presents to the software operating on the virtual machine an emulated hardware configuration.

A virtual machine management system (sometimes referred to as a virtual machine monitor or a hypervisor) is also often employed to manage one or more virtual machines so that multiple virtual machines can run on a single computing device concurrently. The virtual machine management system runs directly on the native hardware and virtualizes the resources of the machine by exposing interfaces to virtual machines for access to the underlying hardware. A host operating system and a virtual machine management system may run side-by-side on the same physical hardware. For purposes of clarity will we use the abbreviation VMM to refer to all incarnations of a virtual machine management system.

One of the many advantages of a virtual machine (VM) over a physical machine is the ability to quickly and cheaply create multiple instances of the same virtual machine. The abstraction of the virtual machine from the underlying hardware provides for flexible resource allocation and facilitates the ability to move, or "migrate," virtual machines from one host machine to another.

Being able to migrate a virtual machine quickly and easily from one host machine to another is useful, for example, for "load balancing" systems, performing hardware or software upgrades, or handling disaster recovery. More specifically, if a virtual machine requires more processing power than is available on one host machine, it can be moved to another host machine that has extra capacity. Second, if the host machine requires hardware maintenance or a software upgrade, the virtual machine may be migrated from one physical machine to another temporarily, which thereby allows the first physical machine to be taken down and upgraded. Similarly, in the case of disaster recovery, all virtual machines of a datacenter can be migrated to another datacenter that is out of harm's way and then migrated back when the threat passes. Additionally, virtual machines facilitate the offloading of a company or enterprises operation to a hosted datacenter simply to reduce the need for maintaining and upgrading resources. In all cases, this allows, for example, critical business applications to remain up and running without interruption and without the user even being aware of the interruption.

SUMMARY

A virtual machine hard drive can be securely migrated or distributed. A target computing device receives a file containing a virtual hard disk drive that is encrypted by an encryption device on a source computing device. Because the encryption was done on the source computing device, the target computing device requires assistance to decrypt the file. To that end, a key is transmitted inside its protector to the target computing device to decrypt the file. This key is moved from its transmission protector to a locally created protector and bound to the Trusted Platform Module on the target computing device. As a result, the file containing the virtual hard disk is bound to the target computing device.

The virtual hard disk drive contains a guest operating system. A virtual machine manager manages a plurality of operating systems concurrently on a system. The virtual machine manager instantiates a virtual machine and causes the virtual machine to boot the operating system from the virtual hard disk drive. Because the file containing the virtual hard disk drive is encrypted by an encryption device on a source computing device, the virtual machine manager causes the decryption of that file with a key provided in response to a request and transmitted inside its protector. This key is moved from its transmission protector to a locally created protector and bound to the Trusted Platform Module on the target computing device. As a result, the guest operating system and its virtual hard disk is bound to the target computing device through encryption based on a trusted platform module coupled to the target computing device.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different combinations similar to the ones described in this document, in conjunction with other present or future technologies.

Figure 1:
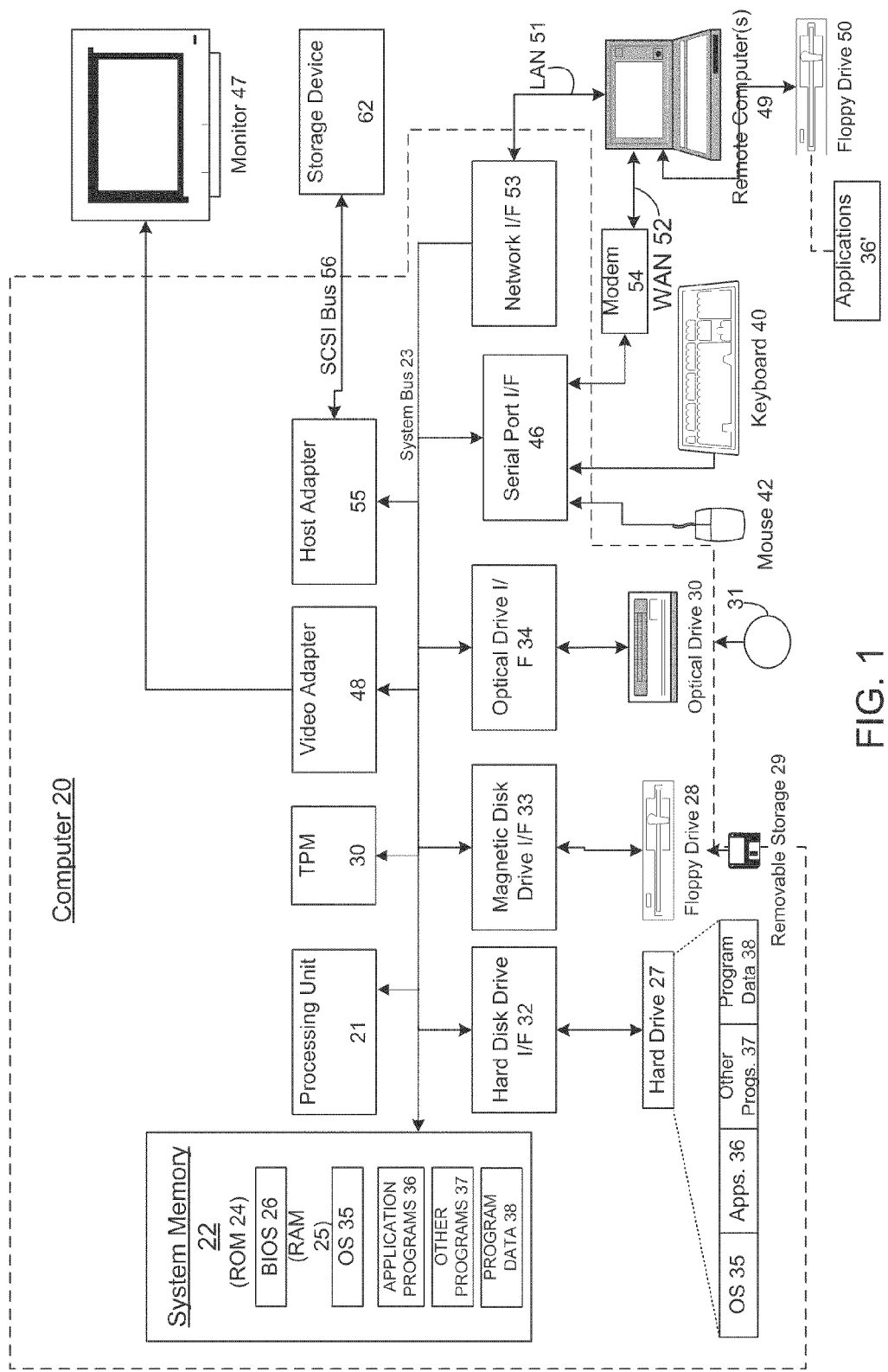
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computing device, such as a client workstation or a server. Generally, program modules include routines, programs, objects, components, data structures and the like that perform particular tasks. Those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Referring now to FIG. 1, an exemplary general purpose computing system is depicted. The general purpose computing system can include a conventional computer 20 or the like, including a general purpose processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment. Generally, such computer readable storage media can be used in some embodiments to store processor executable instructions embodying aspects of the present disclosure.

Depending on the specific physical implementation, severs may include a trusted platform module 30 (or TPM as it is referred to in the art). A TPM 30 and one or more of the processing units 21, and the system memory 22 can be physically co-located, such as on a single chip. In such a case, some or all of the system bus 23 can be, in part, nothing more than silicon pathways within a single chip structure and its illustration in FIG. 1 can be nothing more than notational convenience for the purpose of illustration.

TPM 30 can comprise encryption keys for the encryption and decryption of information provided to it and it can further store values such that they are protected by the hardware design of the TPM 30 itself. Traditionally, the TPM 30 comprises an initial set of immutable public and private encryption keys that can be utilized, in a known and established manner, to obtain disposable public and private encryption keys. TPM 30 typically also has TPM-specific keys stored within the TPM 30 that can include any such set of private and public keys, and are not meant to refer to any specific encryption key set. In addition, the TPM 30 can comprise Platform Configuration Registers (PCRs) that can securely store data provided to the TPM 30 by the processing unit 21 via the system bus 23. In some embodiments, only specific code executed by the processing unit 21 would be permitted to send data to TPM 30 that would modify the values stored in the PCRs.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
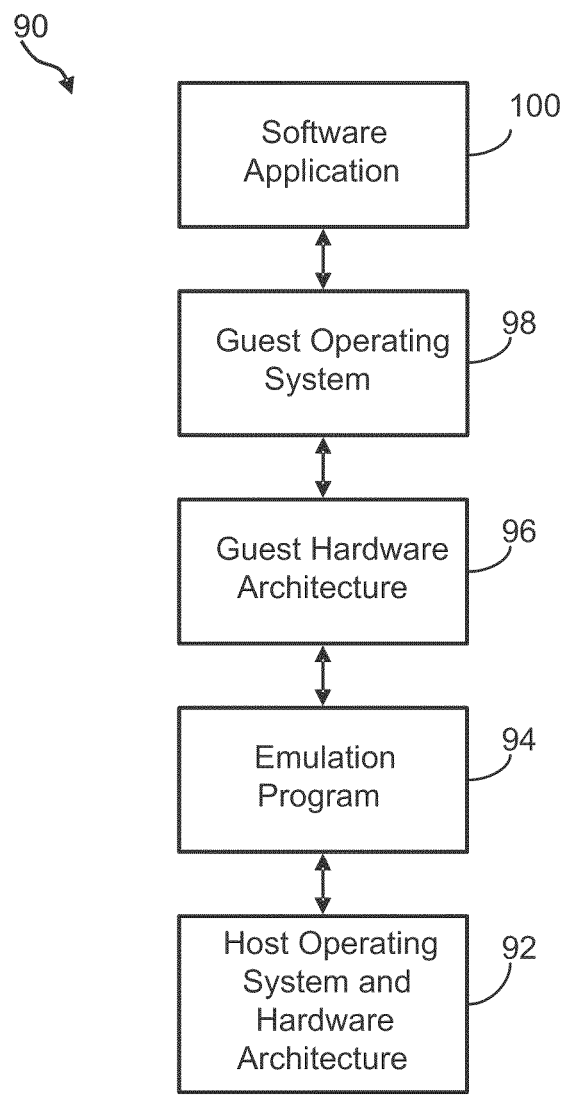
FIG. 2 illustrates the logical stacking of the hardware and software architecture for an emulated operating environment in a computer system.

FIG. 2 is a diagram representing the configuration of hardware and software architecture for an emulated operating environment in a computer system. An emulation program 94 runs on a host operating system and/or hardware architecture 92. Emulation program 94 emulates a guest hardware architecture 96 and a guest operating system 98. Software application 100 in turn runs on guest operating system 98. In the emulated operating environment of FIG. 2, because of the operation of emulation program 94, software application 100 can run on the computer system 90 even though software application 100 is designed to run on an operating system that is generally incompatible with the host operating system and hardware architecture 92.

Figure 3:
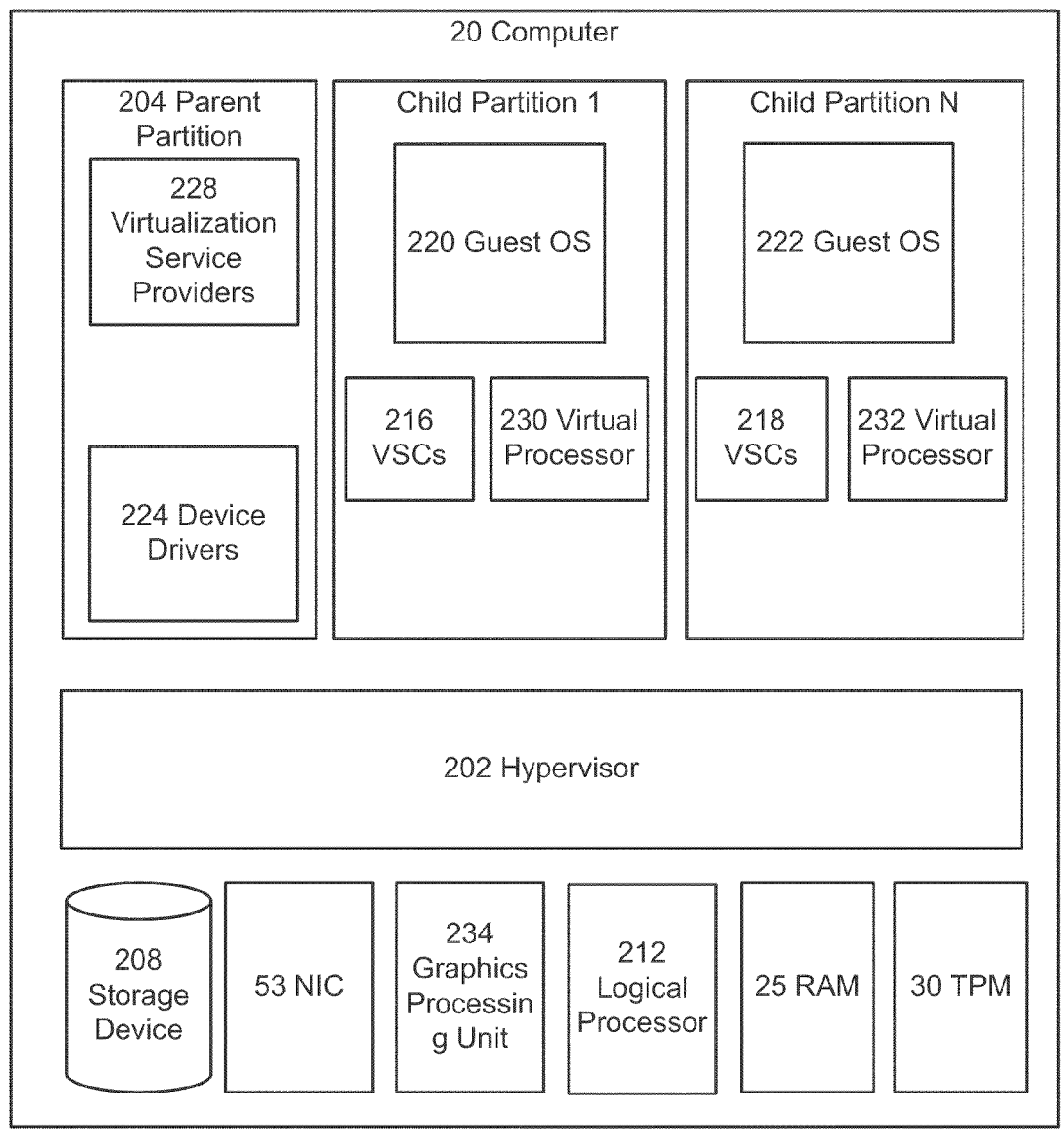
FIG. 3 illustrates a virtualized computing system.

Referring now to FIG. 3, it depicts a high level block diagram of computer systems that can be used in embodiments of the present disclosure. As shown by the figure, computer 20 (e.g., computer system described above) can include physical hardware devices such as a storage device 208, e.g., a hard drive (such as 27 in FIG. 1), a network interface controller (NIC) 53, a graphics processing unit 234 (such as would accompany video adapter 48 from FIG. 1), at least one logical processor 212 (e.g., processing unit 21 from FIG. 1), random access memory (RAM) 25, and a trusted platform module (TPM) 30. One skilled in the art can appreciate that while one logical processor is illustrated, in other embodiments computer 20 may have multiple logical processors, e.g., multiple execution cores per processor and/or multiple processors that could each have multiple execution cores. Continuing with the description of FIG. 3, depicted is a hypervisor 202 that may also be referred to in the art as a virtual machine monitor or more generally as a virtual machine manager. The hypervisor 202 in the depicted embodiment includes executable instructions for controlling and arbitrating access to the hardware of computer 20. Broadly, the hypervisor 202 can generate execution environments called partitions such as child partition 1 through child partition N (where N is an integer greater than 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition. In embodiments the hypervisor 202 can be a stand-alone software product, a part of an operating system, embedded within firmware of the motherboard, specialized integrated circuits, or a combination thereof.

Continuing with the description of FIG. 2 in the depicted example configuration, the computer 20 includes a parent partition 204 that can be configured to provide resources to guest operating systems executing in the child partitions 1-N by using virtualization service providers 228 (VSPs). In this example architecture the parent partition 204 can gate access to the underlying hardware. Broadly, the VSPs 228 can be used to multiplex the interfaces to the hardware resources by way of virtualization service clients (VSCs). Each child partition can include a virtual processor such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, the combination of the virtual processors and various VSCs in a partition can be considered a virtual machine.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. Each guest operating system 220 through 222 can have associated file systems that can have applications stored thereon such as e-commerce servers, email servers, etc., and the guest operating systems themselves. The guest operating systems 220-222 can schedule threads to execute on the virtual processors 230-232 and instances of such applications can be effectuated.

Figure 4:
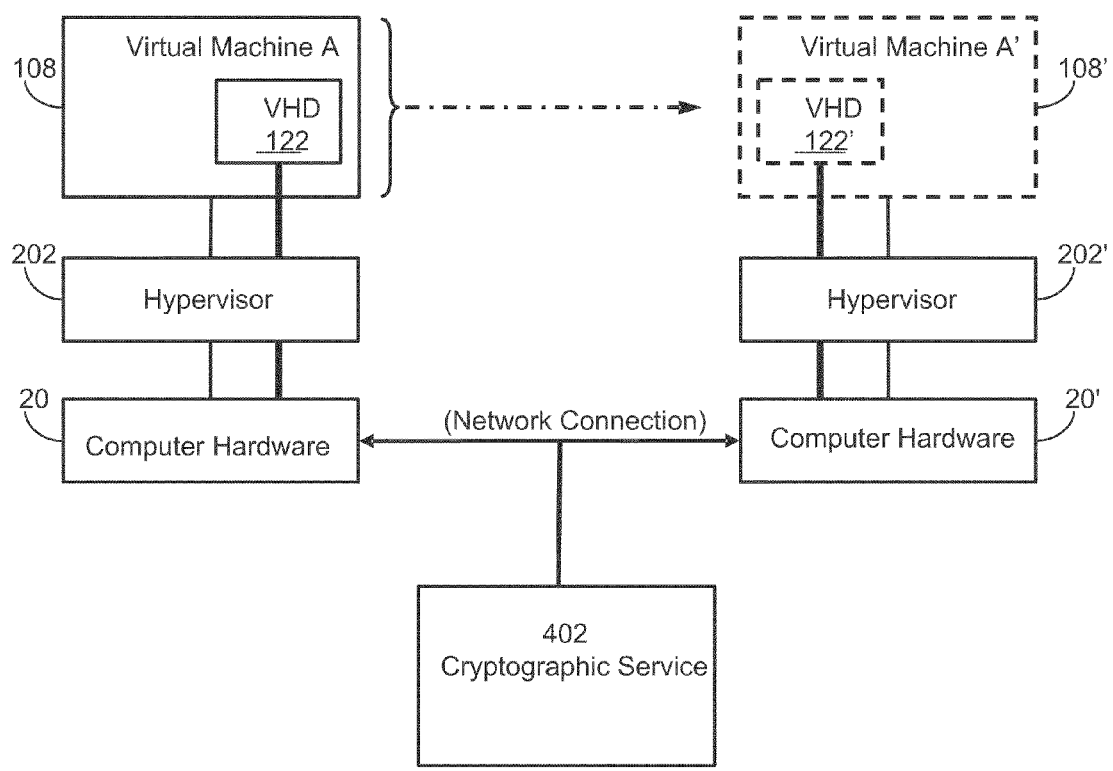
FIG. 4 illustrates a migration of a virtual hard drive to another computing device.

FIG. 4 is a block diagram that illustrates two instantiations of the system shown in FIG. 3, connected to common external storage in a preferred embodiment of the invention for performing virtual hard disk migration in a virtual machine environment. More specifically, the networked system of FIG. 4 includes a first system comprising computer hardware 20, hypervisor 202, and VM A 108 that further includes a virtual hard drive (VHD) 122. Additionally, the networked system of FIG. 4 includes a second system comprising computer hardware 20', hypervisor 202', and VM A' 108' that further includes a VHD 122', wherein VM A' 108' and VHD 122' are representative of a replication of VM A 108 and VHD 122 that results from the voluntary and dynamic migration of VM A 108 from hypervisor 202 to hypervisor 202'.

As known and understood by those skilled in the art, a VHD is a virtualized device, logically equivalent to a physical hard drive device, that a virtual machine emulates for a guest operating system. (As used herein, the terms "hard disk," "hard drive," and "hard disk drive" may be used interchangeably.) In FIG. 4, VM A 108 comprises VHD 122 which, for example, the virtual machine may emulate for guest OS A (e.g., Guest OS 220 of FIG. 3) as hard drive "C:" (not shown). VHD 122 is maintained by a file system of storage device 208 (see FIG. 3). In this embodiment, VHD 122 is implemented as a single data file, file 128, on the physical hard disk of storage device 208. Of course, as will be understood and readily appreciated by those skilled in the art, these VHD representations may be located in several files and across separate hard drives or separate computer systems, or they can be something other than a file (for example, a table in a database, a database, a block of active memory, etc.). In addition, a VHD is a widely used term that described a virtual machine file format. The virtual machine VHD typically contains the entire virtual machine software stack including an operating system, applications, and disk volumes in a single file. In accordance with an aspect of the invention, cryptographic service 402 may be employed to assist in the migration of the VHD to prevent unauthorized migration as is described more fully below.

It is not uncommon for an enterprise to have a repository of many VHDs. The VHDs can be deployed on VMMs residing on different physical servers across data centers and/or business locations. This capability is an important aspect of a dynamic IT environment. The VHDs and the repository are also exposed to security threats, whether by rogue IT administrators who have access to the enterprise IT infrastructure or by illicit copies being spirited out of the enterprise premises. The VHD copies could be booted on an unauthorized system with the appropriate VMM software. The risks are increased when an enterprise expands its IT operations to "edge" co-location data centers, or those that are operated by a hosting service vendor. In such environments, staff of the hosting company have authorized access to the physical servers running the various VHDs. It is difficult to protect against such staff compromising the security of the VHDs, thereby exposing an enterprise to intellectual property theft. The security risk limits the widespread adoption of hosted and cloud computing.

In the event that a need arises to migrate VM A from host server 20 to host server 20', for any reason, the VHD can be transferred from one host to another or from a repository to a computing device and then booted on the new computing device. FIG. 4 illustrate on example of how a VHD 122 can be transferred from storage device 124 to storage device 124'. Thereafter another instance of VHD 122' can be booted to create an instance of VM A' on hypervisor 202' via a standard network connection between computer hardware 20 and computer hardware 20'. In this example, the file system and disk file associated VHD 122 exist on the physical hard drive of computer hardware 20. Therefore, in order to migrate VM A 108 of hypervisor 202 to VM A' 108' of hypervisor 202', the entire disk content must be transferred, e.g., via the network connection there between.

There are additional complexities involved in the process of moving a VHD from one server to another. For example, because the VHD contains all of the information necessary to instantiate a copy of a computing system and run it on anther platform, security concerns are introduced. In particular, in some instances it my be necessary to replicate the VHD containing a virtual machine operating system image or mount it as a data volume for content retrieval or modification. However, such processes could be performed in an authorized or unauthorized manner. In order to protect against unauthorized uses, a fully configured and operational virtual machine can be distributed as an encrypted VHD. The operating system in the virtual hard disk can be temporarily disabled, using cryptographic techniques, prior to distribution. In that case, a user will be prompted to enter a single-use authorized recovery password on the first attempt to boot the operating system. The boot process will not succeed until this recovery process is successfully completed. The successfully booted virtual machine can use a platform hardware backed security device (e.g., trusted platform module) that is exposed by the virtualization software to re-seal the virtual machine. As a result, the software inside the virtual hard disk is prevented from executing on an unauthorized physical server.

Figure 5:
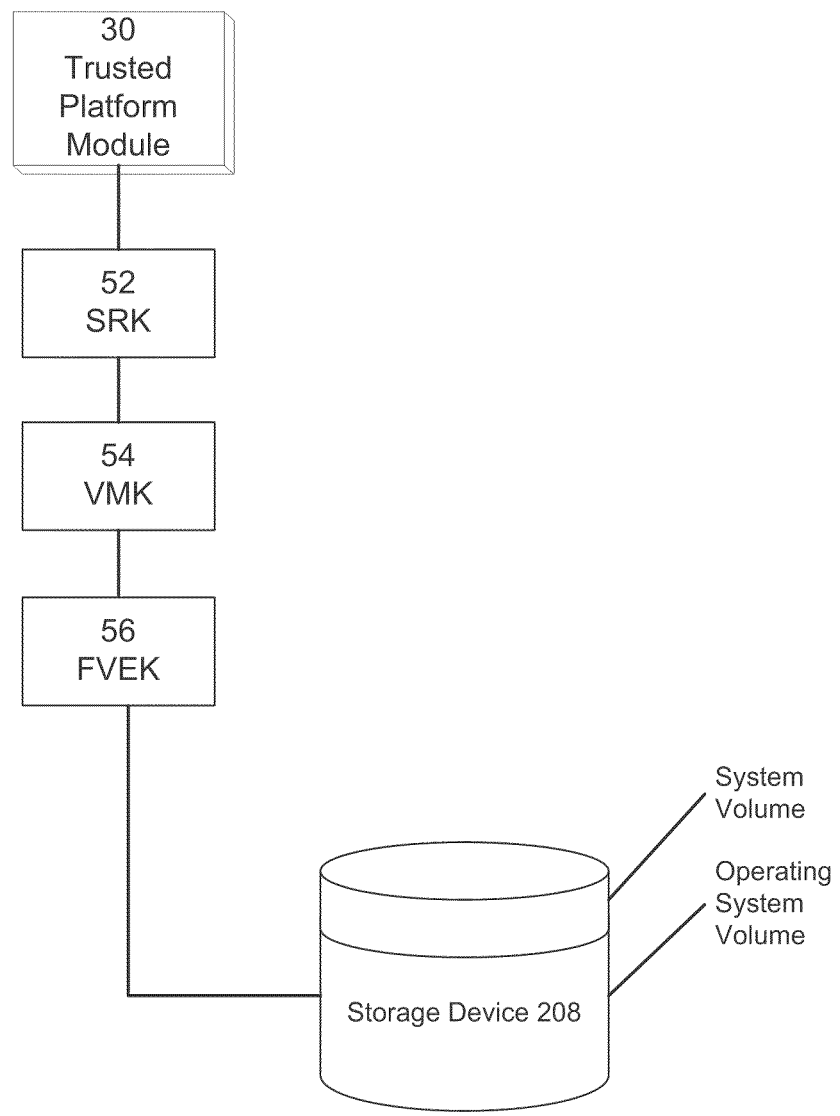
FIG. 5 illustrates binding of a drive to a computing device.

As alluded to above, a TPM as is known in the art generally has an endorsement key that is created at manufacture time and cannot be changed. It also has an owner password and a storage root key that is used for implementing encrypted storage. The storage root key is created after the system is running and can later be cleared from the BIOS. FIG. 5 illustrates how the TPM 30 is employed to encrypt storage device 208. TPM 30 contains a storage root key (SRK) that is stored within the TPM. The SRK seals (i.e., through encryption) a volume master key (VMK). The volume master key is the key that is used to encrypt the full volume encryption key (FVEK). The FVEK is the key that is used to perform the encryption on the operating system volume of storage device 208. Since both the FVEK and the VMK are both separately encrypted, they can be stored in the clear text portion of the system volume. The clear text system volume includes the master boot record, the boot manager and boot utilities. The rest of the volume is encrypted as a single file.

As can be understood from the above description, because the encryption is tied back to the TPM which has encryption keys that are embedded at manufacture time, the encrypted drive is tied to the particular TPM of the particular hardware. If an attempt is made to move the encrypted volume to different hardware, the SRK will not match. Consequently, neither the VMK nor the FVEK, which are protected by virtue of the VMK being protected, e.g., encrypted, by the keys of TPM in the source system, can be recovered and unauthorized use is prevented. As a result, because the VMK and FVEK are required to decrypt and encrypted a VHD, unauthorized use of the VHD can be similarly prevented.

TPM 502 can also be used to ensure that there is a chain of trust from the hardware device 20 during the boot process. In general the chain of trust process validates each component of hardware and software from the bottom up (bare metal, to firmware, to the operating system, and the application programs). To start the chain of trust, the processor must be in a known state, running known code. From this initial condition, each change of state checks that the previous state is valid. As an initial matter, the a system that boots up with a known secure boot process starts by checking the BIOS against the TPM keys. For example the BIOS performs a hash function and compares the value to a known value that is stored and signed with a TPM key. If the BIOS is verified, it can then check the master boot record and ensure that it is validated against a hash function, the master boot record then decrypts the operating system using a key that is obtained from the TPM. Each step of the process ensures that the next step in the process has been validated.

Figure 6:
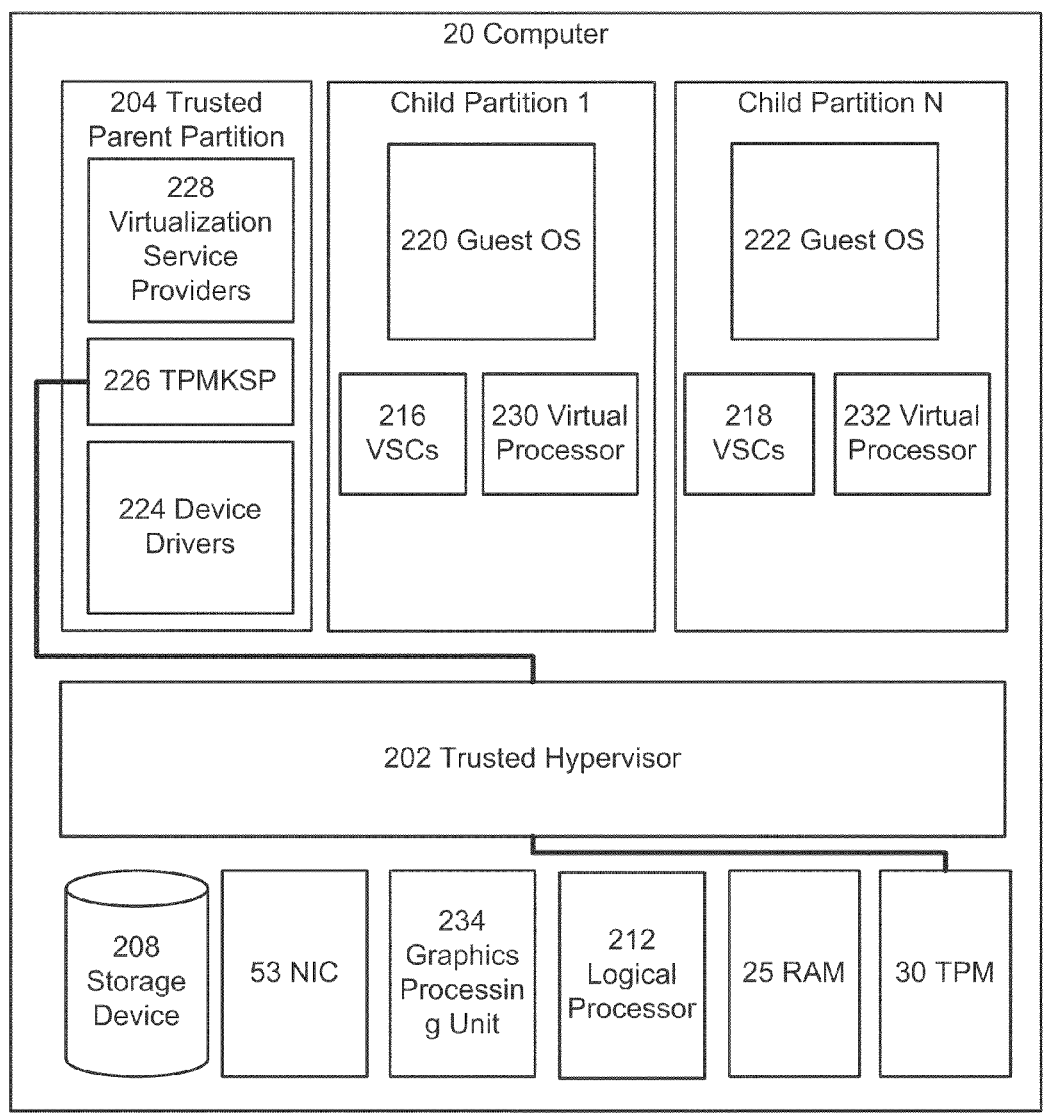
FIG. 6 illustrates a trusted virtual system.

In the case of a virtual machine system, a similar process is employed. The TPM is used to encrypt the BIOS hash which follows the chain of trust through a trusted hypervisor and then to a trusted parent partition. The trusted parent partition then is used to ensure that eh child partitions are trusted and so on. As shown in FIG. 6, after such a process, the computer system 20, has a trusted hypervisor 202 and a trusted partition 204. The trusted partition provides a TPM key storage provider (TPMKSP) 226 service to the child partition, so that the child partition has access to a virtualized TPM key that is tied back to TPM 30 through a chain of trust. This process ensures that the TPM virtualization cannot be spoofed and disengage from the underlying TPM 30. If the TPM 30 could be spoofed through virtualization then the VHD itself could be moved along with a virtual TPM and the chain of trust would be broken. However, by ensuring that there is a chain of trust through the hardware TPM, the VHD can also be assured to be tied to the underlying hardware. As a result, an encrypted VHD cannot be moved and restarted on an unauthorized machine because the TPM on the new hardware cannot be used to decrypt the virtual machine operating system or data volumes.

According to an aspect of the invention, authorized moves of the VHD are facilitated. To that end, a recovery password mechanism can be used to decrypt the VEK on the target system. Once the VEK is recovered a VHD can be decrypted by the FVEK on new underlying hardware, either in it's entirety or in portions on demand.

When a VHD is migrated to a different computing device, the encryption keys associated with the prior TPM would not function to decode the VHD as described herein because the encryption key (VEK) is sealed in a protection mechanism, e.g., it is encrypted by the SRK of the TPM. As a result, the VHD will not operate on unauthorized hardware. To address that issue, in addition to the VEK being protected, e.g., encrypted, by the TPM of the source system, additional copies of the key can be encrypted by a service and provided along with the VHD or distributed separately from the VHD. In such a case, the VEK key can be recovered by receiving a decryption password from a service. For authorized users, the boot of the VHD on the new computing device will cause a request for a recovery password. The recovery password is then supplied to the user through a cryptographic service, that is used to recover the additional copy of the VEK. Thereafter the VEK is recovered and used to decrypt the FVEK. Both can be stored in the TPM of the target system and used to decrypt the VHD. The VEK, once decrypted, can be re-encrypted by the SRK of the target and bound to the target system through storage in the TPM.

Figure 7:
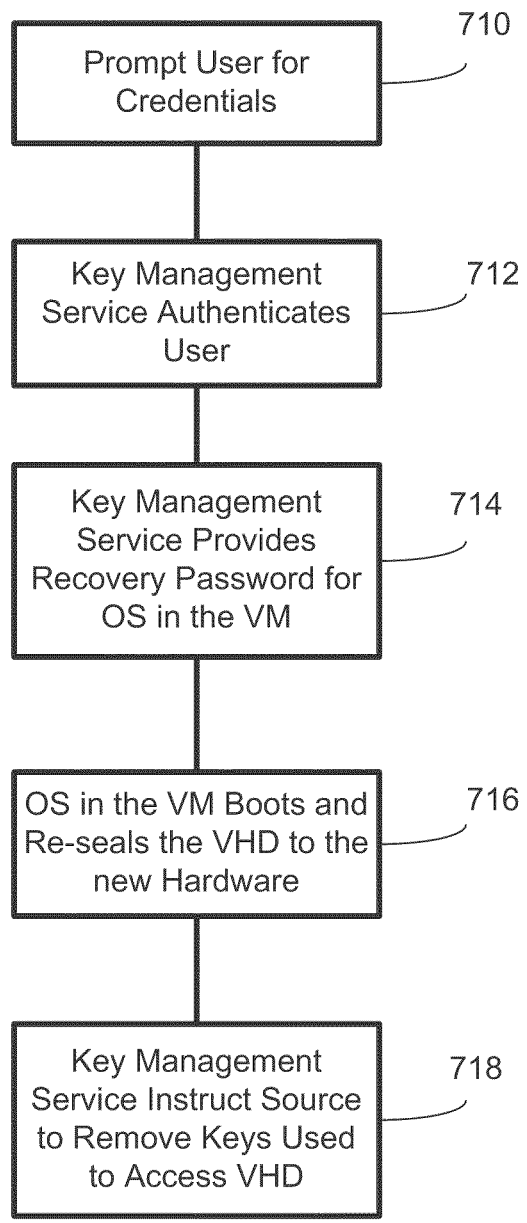
FIG. 7 illustrates a flow chart for authorized migration of a virtual hard drive.

FIG. 7 provides additional details regarding the authentication during the migration of the VHD. Initially, at 710 the user is prompted for credentials. The credentials are then checked by a key management service on the host partition. At step 712 the key management service authenticates the user. The key management system can communicate with the cryptographic service over a network, for example (see FIG. 4). At 714, the key management service provides the recovery password for the OS in the VM, which is used to decrypt the copy of the VEK that is protected by the recovery password. This allows the boot process to continue in the VM at 716. The OS is then resealed in the VM and tied to the new hardware, e.g., through the TPM. After the VHD is resealed, the key management service can then instruct the source to remove the keys that were used to access the VHD. This will prevent the keys from being access and used to port the VHD to an unauthorized system and the VHD will remain encrypted on the target system In addition to the above embodiment, the entire VHD can be decrypted on the target system and re-encrypted on the target system. In such a case, new keys can be generated based on the TPM of the target system and thereby bound to the target system.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:
1. A method for booting a virtual machine, comprising:
receiving, on a second computing device, a file containing a virtual hard disk drive, the file being at least partially encrypted by a first encryption key, the first encryption key cryptographically protected by a first mechanism provided by a first device on a first computing device;
receiving, on the second computing device, a copy of the first encryption key cryptographically protected by a second mechanism provided by a service, wherein the copy of the first encryption key cryptographically protected by the second mechanism is received from the service;
receiving, on the second computing device, a recovery password from the service in response to a boot of the virtual hard disk drive on the second computing device by an authorized user;
using the recovery password to recover the copy of the first encryption key on the second computing device cryptographically protected by the second mechanism;

using the recovered copy of the first encryption key to decrypt at least a portion of the at least partially encrypted file;

encrypting the copy of the first encryption key with a second device on the second computing device.

2. The method as recited in claim 1 wherein the copy of the first encryption key is encrypted by the second computing device based on a trusted platform module coupled to the second computing device.

3. The method as recited in claim 1 wherein the protection mechanism comprises encryption.

4. The method as recited in claim 1 wherein the at least partially encrypted file comprises an operating system that is encrypted.

5. The method as recited in claim 1 wherein the at least partially encrypted file comprises an encrypted volume key that is used to decrypt the partially encrypted file and wherein the first encryption key is used to decrypt the volume key.

6. The method as recited in claim 5 wherein the volume key is stored in a metadata portion of the file.

7. A computer-readable storage device having stored thereon computer-readable instructions that upon execution by a computing device, at least cause:

the reception on a target computing device, a file containing a virtual hard disk drive, the file comprising a virtual hard disk that contains virtual machine configuration information and an operating system wherein the operating system is executable on a virtual machine configured in accordance with the information and wherein the operating system is encrypted by a key that is cryptographically protected by a first mechanism provided by a first device on a source computing device;

receiving on the target computing device, a copy of the key protected by a second mechanism provided by a service;

receiving on the target computing device, a recovery password from the service in response to a boot of the virtual hard disk drive on the target computing device by an authorized user;

recovering on the target computing device the copy of the key protected by the second mechanism by using the recovery password;

using the recovered copy of the key to decrypt the operating system on the target computing device; and encrypting the copy of the key with a second key that is unique to the target computing device.

8. The computer-readable device as recited in claim 7 wherein the copy of the key is encrypted by the target computing device based on a trusted platform module coupled to the target computing device.

9. The computer-readable device as recited in claim 7 wherein the first device on the source computing device comprises a trusted platform module.

10. The computer-readable device as recited in claim 7 wherein the key is protected by encryption.

11. The computer-readable device as recited in claim 7 wherein the file comprising the virtual hard disk comprises at least one application program that is encrypted.

12. The computer-readable device as recited in claim 7 wherein the file comprises an encrypted volume key that is used to decrypt the operating system and wherein the key is used to decrypt the volume key.

13. The computer-readable device as recited in claim 12 wherein the volume key is stored in a metadata portion of the file.

14. A computing device comprising:

a processor;

a memory in communication with said processor when the computing device is operational, the memory having stored thereon:

a virtual hard disk drive containing a guest operating system;

a virtual machine manager, the virtual machine manager managing a plurality of operating systems concurrently on the system, the virtual machine manager instantiating a virtual machine and causing the virtual machine to boot the guest operating system from the virtual hard disk drive, wherein the guest operating system is encrypted by a key that is protected by a first mechanism provided by an encryption device on a source computing device; the virtual machine causing the decryption of the guest operating system with a copy of the key protected by a second mechanism provided by a service wherein the copy of the key is recovered by using a recovery password received from the service in response to a boot of the virtual hard disk drive by an authorized user; and encrypting the copy of the key with a second key that is unique to the computing device.

15. The computing device as recited in claim 14 wherein the copy of the key is encrypted by the virtual machine based on a trusted platform module coupled to the computing device.

16. The computing device as recited in claim 14 wherein the encryption device on the source computing device comprises a trusted platform module.

17. The computing device as recited in claim 14 wherein the copy of the key recovered in response to the request on the computing device is encrypted.

18. The computing device as recited in claim 14 wherein the virtual hard disk drive comprises at least one application program that is encrypted.

19. The computing device as recited in claim 14 further comprising a trusted computing module.

\* \* \* \* \*